Figure 1:
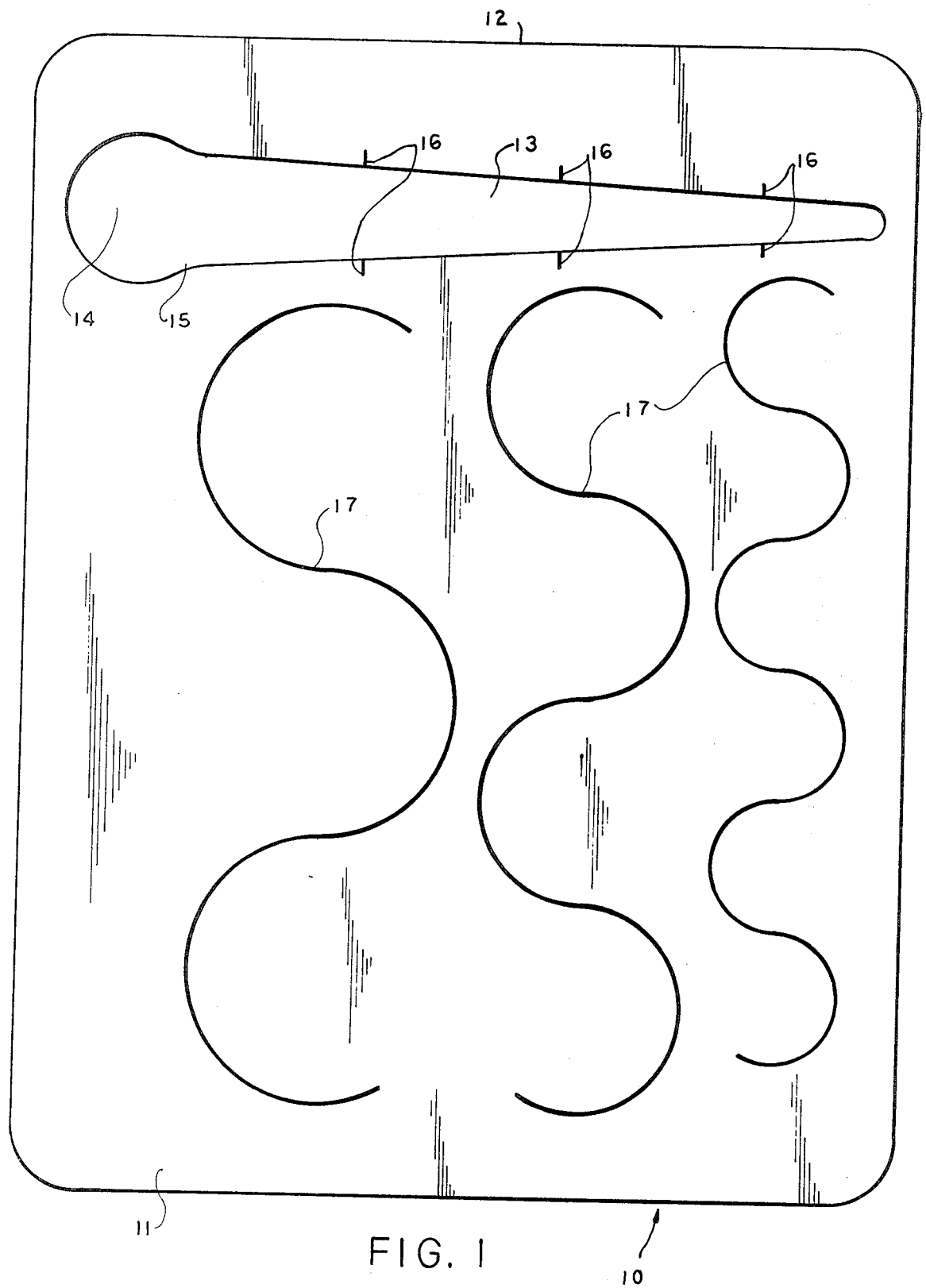
Figure 2:
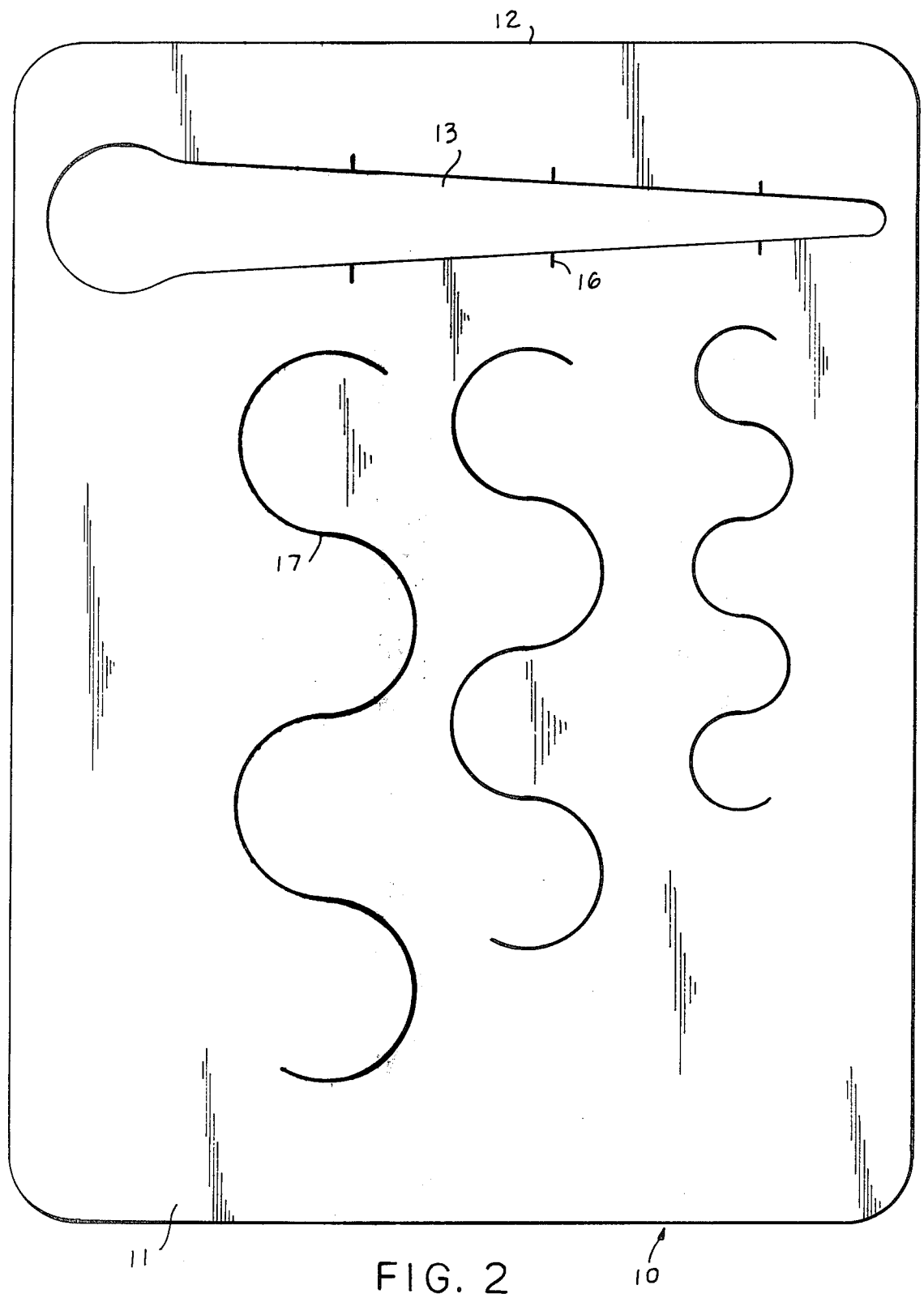
Figure 3:
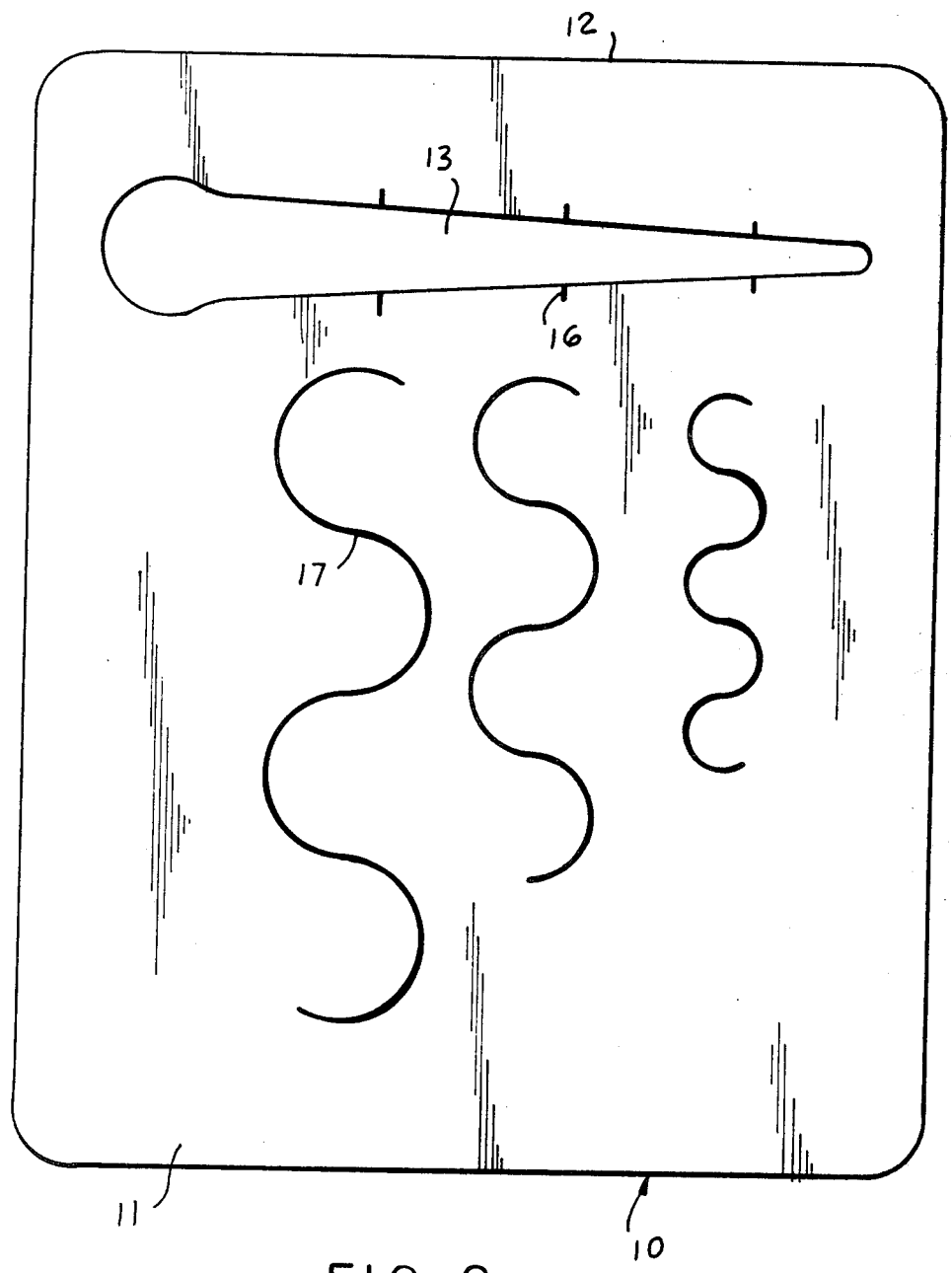
Figure 4:
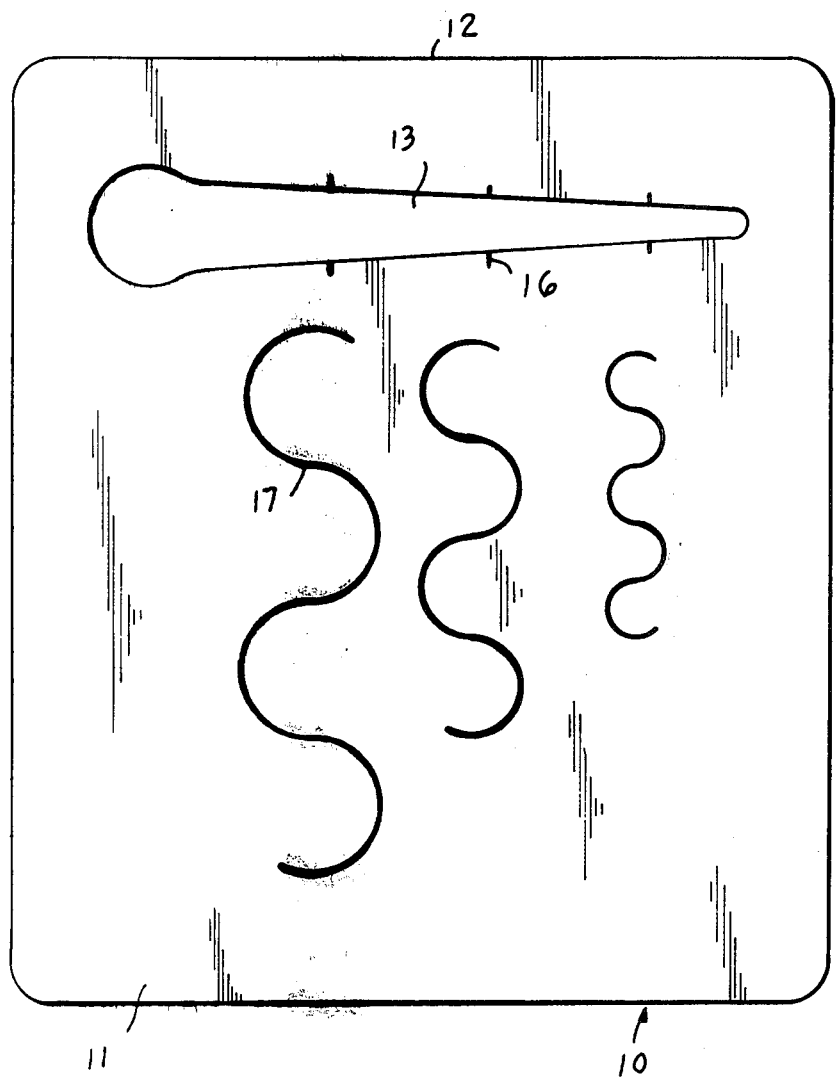

United States Patent [19]

Klein

[11] 4,194,294
[45] Mar. 25, 1980

[54] DEVICE IN PERMANENT WAVING

[75] Inventor: Gustave J. Klein, Great Neck, N.Y.

[73] Assignee: Revlon, Inc., New York, N.Y.

[21] Appl. No.: 967,953

[22] Filed: Dec. 11, 1978

[51] Int. Cl.² ........................... G01B 5/08; G01B 5/00
[52] U.S. Cl. ...................................... 33/178 B; 132/9
[58] Field of Search ............ 33/174 R, 174 M, 178 B; 132/9

[56] References Cited

U.S. PATENT DOCUMENTS

| 447,475 | 3/1891 | Pomeroy | 33/178 B |
| 3,858,325 | 1/1975 | Goerler | 33/178 B |

FOREIGN PATENT DOCUMENTS 335062 6/1922 Fed. Rep. of Germany ......... 33/178 B
1007345 5/1952 France ................................... 33/178 B
1338697 11/1973 United Kingdom ................... 33/178 B

*Primary Examiner*—Richard R. Stearns
*Attorney, Agent, or Firm*—Leon E. Tenenbaum

[57] ABSTRACT

A device for selecting a curling rod of a specified diameter to provide a curl of selected size and configuration in permanent waving with a reducing medium of known composition, comprising a card which is provided with a horizontal tapered slot which has an enlargement beyond its widest end, a plurality of pairs of aligned vertical guide lines both above and below the slot, and in substantial alignment with each pair of guide lines a depiction of a curl showing its approximate size and configuration as obtained by the use of the curling rod of the measured diameter.

3 Claims, 5 Drawing Figures

DEVICE IN PERMANENT WAVING

The present invention relates to permanent waving of hair, and particularly relates to methods for controlling the size and configuration of the curl in permanent waving and devices for use in such methods.

In copending patent application Ser. No. 892,744, filed Apr. 3, 1978 now U.S. Pat. No. 4,158,704, there are disclosed compositions and methods for effecting permanent waving. The methods involve the consideration and balancing of several inter-related parameters, time, temperature, concentration of the reductant composition, pH of the reductant composition, condition of the hair, and porosity of hair, for carrying out the reduction step in permanent waving to achieve the proper and desired cleavage of the disulfide linkages in the hair proteins. These compositions and methods do not, however, provide a curl having a desired size and configuration.

The size and configuration of the curl which is obtained when the hair is first placed in rollers or curling rods and then treated with a permanent wave solution is related to the diameter of the curling rod. An ideal permanent wave should have a result of about two times the diameter of the curling rod being used. This ratio varies with the overall quality of the hair. Hair that "perms" easily really means that its waves usually are twice the diameter of the rod. Some hair, especially hair that has been damaged by a prior treatment such as bleaching, will rarely curl to the desired result. The hairdresser will select curling rods of different diameter so that tight curls are obtained with small size rods and larger curls with large rods, where the size of the rod refers to its diameter. Of course, these results will vary with the hair length and capability of wrapping. Short nape hair almost always requires smaller rods.

Small size rods have a diameter less than $\frac{1}{4}''$; medium size, $\frac{3}{8}''$ to $\frac{1}{2}''$; and large size, $\frac{1}{2}''$ to $\frac{3}{4}''$. If one were to use a $\frac{1}{4}''$ or smaller size rod, the resulting curl would be rather tight, approximately a $\frac{1}{2}''$ to $\frac{3}{4}''$ curl. Such particular style can be regarded as a modified Afro or natural look. The large size rod, up to $\frac{3}{4}''$, would give a larger wave and approach what is called body waving. When a hairdresser uses larger size rods, a permanent wave is frequently not obtained because the bond shifting characteristics of large rods are not sufficient to move enough bonds. This results from the differences between the inner distance and the outer distance in the travel of a cylindrical shaft of hair as it is wound around a rod. This difference determines the degree of bond shifting possible. The larger the diameter of the rod, the smaller is the difference between the inner and outer distances, and the smaller this difference the greater is the chance of failure in the permanence of the wave. The inability to obtain most body waves is usually caused by the use of too large a rod.

In the methods described in the patent application referred to above, all processing is as close to optimum as possible. If the operator evalutes the hair properly, the result will be a curl about 2 to $2\frac{1}{2}$ times the size of the rod. If, however, the processing is stopped before a complete reduction is reached there is no assurance that the desired curl will be obtained. Furthermore, the size of the curl using these methods cannot be made greater than 2 to $2\frac{1}{2}$ times the size of the rod.

It is accordingly an object of the present invention to provide a method for obtaining curls about 3 to 4 times the diameter of the curling rod.

It is another object of the present invention to provide a method for obtaining curls about 3 to 4 times the diameter of the curling rod using the parameters disclosed in the copending patent application referred to above.

It is a further object of the present invention to provide means for selecting the diameter of the curling rod to give a desired curl.

It has now been found that by using a reducing composition having a concentration of about 7 to 23 percent by weight of reducing agent and a pH of about 5.0 to 6.9, it is possible to obtain curls which are from about 3 to 4 times the diameter of the curling rod, so that with a $\frac{1}{4}''$ rod, curls having a length of $\frac{3}{4}''$ to $1''$ are obtained. Such curls have the very open, soft appearance of a true body wave of curls obtained by the use of rods of larger diameter.

By modifying the pH of and concentration of the reductant in the composition, the rate of the reduction can be decreased. This reduces the number of disulfide bonds that are opened and shifted and therefore allows many of these to slip back and produce a curl size which is similar to that obtained with a larger size rod.

Since the relationship between the size of the curl and the diameter of the curling rod will be different for different reducing compositions, the present invention provides a device for selecting the rod diameter which will produce the desired curl size for a particular reducing composition. These devices are provided in the form of sheets or cards that have means for measuring the diameter of the rod and correlating this measurement with the size of the curl obtained, depending upon the particular composition of the reducing medium being used.

Examples of such devices are illustrated in the drawings in which

Figure 5:
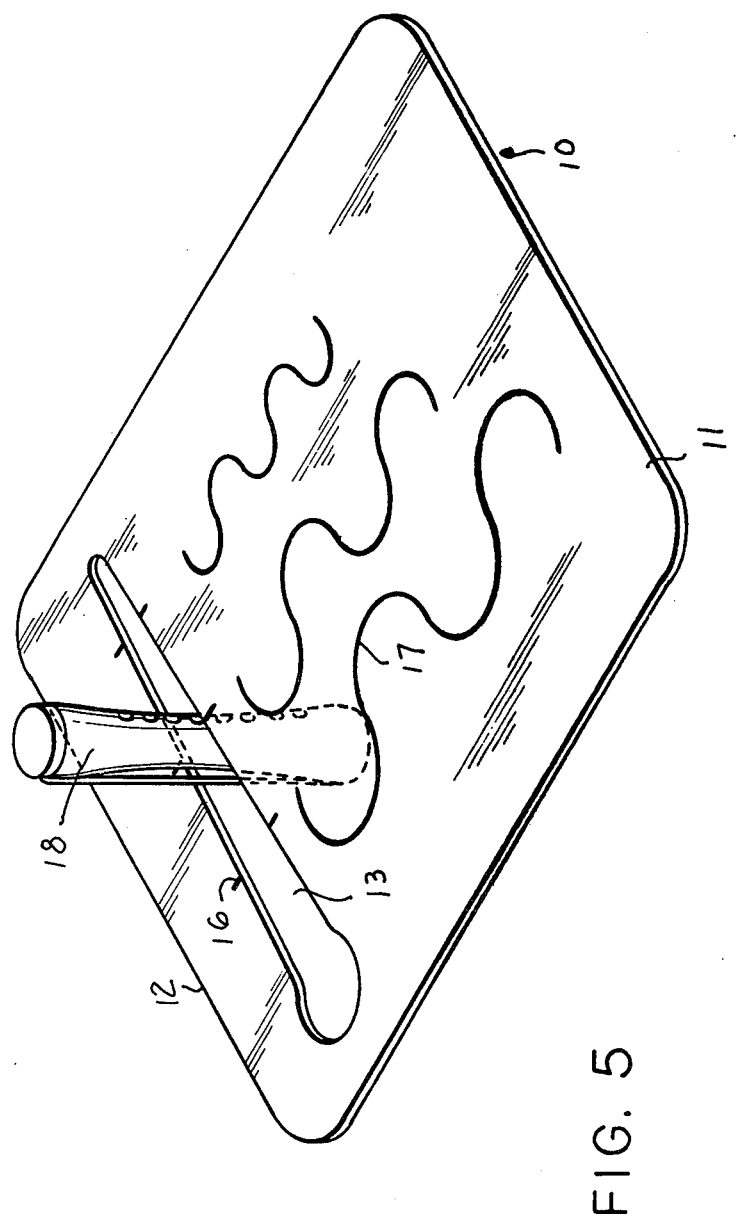

FIGS. 1 to 4 show the front of a sheet or card for a different reducing composition and FIG. 5 is a perspective view of a curling rod within the slot.

Referring to the drawings which illustrate preferred embodiments of the invention and in which drawings the same number refers to the same structure or representation in each figure, the device 10 is comprised of a card 11, which may be fabricated from paper, cardboard, wood, plastic or metal. The top portion 12 of the card is provided with a horizontal tapered slot 13 which has an enlargement 14 beyond its widest end 15. The slot is marked both above and below with a plurality of pairs 16 of aligned vertical guide lines. Preferbly three (3) such pairs are used. In substantial alignment with each pair is a depiction of a wave 17 showing the approximate size and configuration of the curl obtained by the use of the curling rod 18 of the particular diameter as measured in the tapered slot.

If desired, instructions for the use of the card and application of the reducing composition can be placed on either the front or back of the card.

In using the device, the operator selects the card for the particular reducing composition and then the wave size that is desired. The operator then inserts curling rods of different diameter into the slot, using the enlargement for convenience in insertion, until a match is obtained between the diameter of the curling rod and the wave size desired. If curls of a size intermediate between those shown on the card are desired, an estimate of the size of the curling rod is made by determining the corresponding position on the tapered slot for such intermediate curls.

Where the diameter of a curling rod is not uniform throughout its length, but narrows in the center portion, the diameter of the center portion is used to measure the desired diameter of the curling rod.

I claim:

1. A device for selecting a curling rod of a specified diameter to provide a curl of selected size and configuration in permanent waving with a reducing medium of known compostion, comprising a card which is provided with a horizontal tapered slot which has an enlargement beyond its widest end, a plurality of pairs of aligned vertical guide lines both above and below the slot, and in substantial alignment with each pair of guide lines a depiction of a curl showing its approximate size and configuration as obtained by the use of the curling rod of the measured diameter.

2. A device according to claim 1 wherein the horizontal tapered slot is located in the top portion of the card and the curl configurations are below.

3. A device according to claim 2 wherein there are three pairs of aligned vertical guide lines.

* * * * *